(12) United States Patent
Ferrarons Llagostera et al.

(10) Patent No.: US 10,475,045 B2
(45) Date of Patent: Nov. 12, 2019

(54) DATABASE MANAGEMENT METHODS, SYSTEMS, AND DEVICES FOR IDENTIFYING RELATED CUSTOMER SUPPORT TICKETS

(71) Applicant: CA, Inc., New York, NY (US)

(72) Inventors: Jaume Ferrarons Llagostera, Barcelona (ES); David Sánchez Charles, Barcelona (ES); Victor Muntés Mulero, Barcelona (ES); Josep Lluís Larriba Pey, Barcelona (ES)

(73) Assignee: CA, Inc., New York, NY (US)

( * ) Notice: Subject to any disclaimer, the term of this patent is extended or adjusted under 35 U.S.C. 154(b) by 563 days.

(21) Appl. No.: 15/214,013

(22) Filed: Jul. 19, 2016

(65) Prior Publication Data

US 2018/0025361 A1    Jan. 25, 2018

(51) Int. Cl.
*G06Q 30/00* (2012.01)
*G06F 16/901* (2019.01)
*G06F 16/9535* (2019.01)
*G06F 16/2457* (2019.01)

(52) U.S. Cl.
CPC ..... *G06Q 30/016* (2013.01); *G06F 16/24578* (2019.01); *G06F 16/9024* (2019.01); *G06F 16/9535* (2019.01)

(58) Field of Classification Search
None
See application file for complete search history.

(56) References Cited

U.S. PATENT DOCUMENTS

| 9,229,800 | B2* | 1/2016 | Jain | G06Q 30/01 |
| 9,524,475 | B1* | 12/2016 | Cmielowski | G06N 99/005 |
| 2005/0097207 | A1* | 5/2005 | Gluhovsky | H04L 41/0681 709/224 |
| 2014/0043983 | A1* | 2/2014 | Huang | H04L 41/0677 370/244 |

(Continued)

OTHER PUBLICATIONS

Backstrom, Lars, and Jure Leskovec. "Supervised random walks: predicting and recommending links in social networks." *Proceedings of the fourth ACM international conference on Web search and data mining.* ACM, 2011.

(Continued)

*Primary Examiner* — Alan Chen

(57) ABSTRACT

A network device associated with a database management system receives information associated with a customer support ticket. Based on information in the database management system, a direct relationship between the received customer support ticket and a customer support ticket in the database may be determined. A graph including nodes representing customer support tickets is generated based on information in the database. Edge prediction is performed on the graph to derive relationships among the nodes in the graph. A predictive relationship between customer support tickets is derived. A relationship data set based on the direct relationship between the customer support tickets and based on the predictive relationship between the customer support tickets is generated. The relationship data set associated with the customer support ticket is communicated to the user device.

20 Claims, 10 Drawing Sheets

(56) References Cited

U.S. PATENT DOCUMENTS

| | | | | |
|---|---|---|---|---|
| 2015/0227838 | A1* | 8/2015 | Wang | G06F 11/008 706/12 |
| 2017/0116616 | A1* | 4/2017 | Donatelli | G06N 5/022 |
| 2017/0161335 | A1* | 6/2017 | Akula | G06F 17/30528 |
| 2017/0180201 | A1* | 6/2017 | Guven | H04L 41/0813 |

OTHER PUBLICATIONS

Cao, Shaosheng, Wei Lu, and Qiongkai Xu. "GraRep: Learning Graph Representations with Global Structural Information." *Proceedings of the 24th ACM International on Conference on Information and Knowledge Management.* ACM, 2015.

Chiang, Kai-Yang, et al. "Exploiting longer cycles for link prediction in signed networks." *Proceedings of the 20th ACM international conference on Information and knowledge management.* ACM, 2011.

DuBois, Thomas, Jennifer Golbeck, and Aravind Srinivasan. "Predicting trust and distrust in social networks." *Privacy, Security, Risk and Trust (PASSAT) and 2011 IEEE Third Inernational Conference on Social Computing (SocialCom), 2011 IEEE Third International Conference on.* IEEE, 2011.

Kunegis, Jérôme, et al. "Spectral analysis of signed graphs for clustering, prediction and visualization." *SDM.* vol. 10. 2010.

Leskovec, Jure, Daniel Huttenlocher, and Jon Kleinberg. "Predicting positive and negative links in online social networks." *Proceedings of the 19th international conference on World wide web.* ACM, 2010.

Leskovec, Jure, Daniel Huttenlocher, and Jon Kleinberg. "Signed networks in social media." *Proceedings of the SIGCHI conference on human factors in computing systems.* ACM, 2010.

Li, Yanhua, et al. "Influence diffusion dynamics and influence maximization in social networks with friend and foe relationships." *Proceedings of the sixth ACM international conference on Web search and data mining.* ACM, 2013.

Li, Yeqing, et al. "Large-Scale Multi-View Spectral Clustering via Bipartite Graph." *Proceedings of the $29^{th}$ AAAI Confemece on Artificial Intelligence.* 2015.

Mikolov, Tomas, et al. "Efficient estimation of word representations in vector space." *arXiv preprint arXiv*:1301.3781 (2013).

Pang, Yanwei, et al. "Ranking graph embedding for learning to rerank." *Neural Networks and Learning Systems, IEEE Transactions on* 24.8 (2013): 1292-1303.

Perozzi, Bryan, Rami Al-Rfou, and Steven Skiena. "Deepwalk: Online learning of social representations." *Proceedings of the 20th ACM SIGKDD international conference on Knowledge discovery and data mining.* ACM, 2014.

Sarma, Atish Das, Sreenivas Gollapudi, and Rina Panigrahy. "Estimating pagerank on graph streams." *Journal of the ACM (JACM)* 58.3, Nov. 10, 2009.

Srinivas, Virinchi, and Pabitra Mitra. "Link Prediction in Social Networks Role of Power Law Distribution." (2016).

Tang, Jian, et al. "Line: Large-scale information network embedding." *Proceedings of the 24th International Conference on World Wide Web.* International World Wide Web Conferences Steering Committee, 2015.

Tian, Fei, et al. "Learning Deep Representations for Graph Clustering." *Proceedings of the $28^{th}$ AAAI Conference on Artificial Intelligence.* 2014.

Wang, Peng, et al. "Link prediction in social networks: the state-of-the-art." *Science China Information Sciences* 58.1 (2015): 1-38.

Yan, Shuicheng, et al. "Graph embedding and extensions: a general framework for dimensionality reduction." *Pattern Analysis and Machine Intelligence, IEEE Transactions on* 29.1 (2007): 40-51.

Yang, Shuang-Hong, et al. "Friend or frenemy?: predicting signed ties in social networks." *Proceedings of the 35th international ACM SIGIR conference on Research and development in information retrieval.* ACM, 2012.

Zhou, Dengyong, and Christopher JC Burges. "Spectral clustering and transductive learning with multiple views." *Proceedings of the 24th international conference on Machine learning.* ACM, 2007.

\* cited by examiner

DATABASE MANAGEMENT METHODS, SYSTEMS, AND DEVICES FOR IDENTIFYING RELATED CUSTOMER SUPPORT TICKETS

FIELD

Various embodiments described herein relate to methods, devices, and computer program products and more particularly to methods, devices, and computer program products for database management in computer networks.

BACKGROUND

Customer support centers may operate based on an asynchronous communication between customers and support engineers. A customer with a malfunctioning service or product can initiate the communication with the customer support team by creating a new 'customer support ticket' in the system (also referred to herein as an 'issue', 'ticket', or 'case'). Customer support tickets may refer to data structures and/or database records that include a description of the issue, details as to who opened the ticket (e.g., customer and contact details), and/or the severity of the issue with respect to damage to the customer business. Information in the customer support ticket may be textual or may be values associated with particular fields in the customer support ticket. Techniques may be applied to the database records to detect duplicate entries. Updates to customer support tickets may be performed as additional information regarding the issue becomes available.

A large organization may receive a large volume of customer support tickets for processing. The level of quality of the support provided by the customer support team may be dependent of their ability to handle the large volume of customer support tickets efficiently. The large volume of tickets may include similar and/or related issues. Customer support engineers who are assigned a new customer support ticket have a need to find tickets containing relevant information to aide in solving the new customer support ticket.

SUMMARY

Some embodiments of the present inventive concepts are directed to a database management method. The method includes performing, by a customer support ticket relationship processor of a network device associated with a database management system in a computer network, operations including receiving, from a user device that is associated with a user through a network interface circuit of the network device, information associated with a first customer support ticket. The operations include determining, based on information in the database management system including a database stored in a memory comprising a non-volatile data storage device and based on the information associated with the first customer support ticket, a direct relationship between the first customer support ticket and a second customer support ticket in the database. The operations include generating a graph based on the information in the database, the graph including a first node representing the first customer support ticket, a second node representing the second customer support ticket, and a third node representing a third customer support ticket. The operations include performing edge prediction on the graph to derive relationships among the first node, the second node, and the third node in the graph, deriving a predictive relationship between the first customer support ticket and the third customer support ticket, responsive to the edge prediction, and generating a relationship data set associated with the first customer support ticket based on the direct relationship between the first customer support ticket and the second customer support ticket and based on the predictive relationship between the first customer support ticket and the third customer support ticket. The relationship data set associated with the first customer support ticket is communicated to the user device through the network interface circuit of the network device.

In some embodiments, deriving the predictive relationship between the first customer support ticket and the third customer support ticket includes identifying that the third node representing the third customer support ticket has a direct relationship with the second node representing the second customer support ticket, predicting that the third node has a relationship to the first node responsive to identifying that the third node representing the third customer support ticket has a direct relationship with the second node representing the second customer support ticket, and deriving the predictive relationship between the first customer support ticket and the third customer support ticket based on the predicting that the third node has a relationship to the first node. The predictive relationship includes either of strongly related or strongly unrelated, and the third node may not have a direct relationship with the first node.

In some embodiments, performing the edge prediction on the graph to derive relationships between the first node, the second node, and third node includes generating a topology of the graph. The topology may indicate respective relationships associated with respective pairs of nodes in the graph. Performing the edge prediction on the graph may include determining respective relationship confidence values for the respective relationships associated with the respective pairs of nodes in the graph. The respective pairs of nodes in the graph may include a first pair including the first node and the second node, a second pair including the second node and the third node, and a third pair including the first node and the third node. A relationship confidence value of the respective relationship confidence values is based on an attribute associated with a respective pair of nodes in the graph. The attribute includes product information, product release information, operating system used a customer, impact to organization, and/or severity. A first relationship confidence value may be associated with the first pair, a second relationship confidence value may be associated with the second pair, and a third relationship confidence value may be associated with the third pair.

In some embodiments, generating the relationship data set includes selectively including the third customer support ticket in the relationship data set responsive to the third relationship confidence value exceeding a threshold. The first relationship confidence value may be based on a number of hops in the graph between the first node and the second node. The second relationship confidence value may be based on a number of hops in the graph between the second node and the third node, and the third relationship confidence value may be based on a number of hops in the graph between the first node and the third node.

In some embodiments, communicating the relationship data set associated with the first customer support ticket to the user device includes providing an ordered list of a plurality of elements in the relationship data set associated with the first customer support ticket to the user. The ordered list may provide a higher priority to an element in the relationship data set that includes a customer support ticket status of active. The ordered list may be either of a ranked list or a weighted list.

In some embodiments, providing the ordered list includes determining a cluster of nodes including a plurality of nodes in the graph associated with respective ones of a plurality of customer support tickets. The respective ones of the plurality of nodes include nodes that are directly related to one another. Providing the ordered list may include grouping respective customer support tickets associated with respective ones of the plurality of nodes in the cluster of nodes together in the ordered list by providing an indicator to identify the cluster of nodes.

In some embodiments, the information in the database management system includes information identifying an existing relationship between the first customer support ticket and the second customer support ticket. The method includes predicting a new relationship between the first customer support ticket and the second customer support ticket independent of the information identifying the existing relationship between the first customer support ticket and the second customer support ticket, and modifying the information identifying the existing relationship between the first customer support ticket and the second customer support ticket responsive to the new relationship between the first customer support ticket and the second customer support ticket that was predicted being contradictory to the information identifying the existing relationship between the first customer support ticket and the second customer support ticket.

Embodiments of the present inventive concepts may also be directed to a network device that includes a network interface configured to communicate with a user device through a data network, a customer support ticket relationship processor, and a memory coupled to the customer support ticket relationship processor and storing computer readable program code that is executable by the customer support ticket relationship processor to perform functions and operations as disclosed herein. The operations include receiving, from a user device that is associated with a user through a network interface circuit of the network device, information associated with a first customer support ticket, and determining, based on information in the database management system including a database stored in a memory including a non-volatile data storage device and based on the information associated with the first customer support ticket, a direct relationship between the first customer support ticket and a second customer support ticket in the database. The operations include generating a graph based on the information in the database, the graph including a first node representing the first customer support ticket, a second node representing the second customer support ticket, and a third node representing a third customer support ticket, and performing edge prediction on the graph to derive relationships among the first node, the second node, and the third node in the graph. The operations include deriving a predictive relationship between the first customer support ticket and the third customer support ticket, responsive to the edge prediction, and generating a relationship data set associated with the first customer support ticket based on the direct relationship between the first customer support ticket and the second customer support ticket and based on the predictive relationship between the first customer support ticket and the third customer support ticket. The operations include communicating the relationship data set associated with the first customer support ticket to the user device through the network interface circuit of the network device.

In some embodiments, deriving the predictive relationship between the first customer support ticket and the third customer support ticket includes identifying that the third node representing the third customer support ticket has a direct relationship with the second node representing the second customer support ticket, predicting that the third node has a relationship to the first node responsive to the identifying that the third node representing the third customer support ticket has a direct relationship with the second node representing the second customer support ticket, and deriving the predictive relationship between the first customer support ticket and the third customer support ticket based on the predicting that the third node has a relationship to the first node.

In some embodiments, performing the edge prediction on the graph to derive relationships between the first node, the second node, and third node includes generating a topology of the graph. The topology may indicate respective relationships associated with respective pairs of nodes in the graph. Performing the edge prediction includes determining respective relationship confidence values for the respective relationships associated with the respective pairs of nodes in the graph. The respective pairs of nodes in the graph include a first pair comprising the first node and the second node, a second pair comprising the second node and the third node, and a third pair comprising the first node and the third node.

Embodiments of the present inventive concepts may also be directed to a computer program product that includes a non-transitory computer readable storage medium including computer readable program code embodied in the medium that when executed by a customer support ticket relationship processor of a first network device causes the processor to perform functions and operations as disclosed herein. The operations include receiving, from a user device that is associated with a user through a network interface circuit of the network device, information associated with a first customer support ticket, and determining, based on information in the database management system including a database stored in a memory including a non-volatile data storage device and based on the information associated with the first customer support ticket, a direct relationship between the first customer support ticket and a second customer support ticket in the database. The operations include generating a graph based on the information in the database, the graph including a first node representing the first customer support ticket, a second node representing the second customer support ticket, and a third node representing a third customer support ticket. The operations include performing edge prediction on the graph to derive relationships among the first node, the second node, and the third node in the graph, deriving a predictive relationship between the first customer support ticket and the third customer support ticket, responsive to the edge prediction, and generating a relationship data set associated with the first customer support ticket based on the direct relationship between the first customer support ticket and the second customer support ticket and based on the predictive relationship between the first customer support ticket and the third customer support ticket. The relationship data set associated is communicated with the first customer support ticket to the user device through the network interface circuit of the network device.

In some embodiments, deriving the predictive relationship between the first customer support ticket and the third customer support ticket includes identifying that the third node representing the third customer support ticket has a direct relationship with the second node representing the second customer support ticket, predicting that the third node has a relationship to the first node responsive to the identifying that the third node representing the third customer support ticket has a direct relationship with the second node representing the second customer support ticket, and deriving the predictive relationship between the first customer support ticket and the third customer support ticket based on the predicting that the third node has a relationship to the first node.

In some embodiments, performing the edge prediction on the graph to derive relationships between the first node, the second node, and third node includes generating a topology of the graph. The topology may indicate respective relationships associated with respective pairs of nodes in the graph. Performing the edge prediction includes determining respective relationship confidence values for the respective relationships associated with the respective pairs of nodes in the graph. The respective pairs of nodes in the graph include a first pair comprising the first node and the second node, a second pair comprising the second node and the third node, and a third pair comprising the first node and the third node.

It is noted that aspects of the disclosure described with respect to one embodiment, may be incorporated in a different embodiment although not specifically described relative thereto. That is, all embodiments and/or features of any embodiment can be combined in any way and/or combination. These and other objects and/or aspects of the present invention are explained in detail in the specification set forth below.

DETAILED DESCRIPTION

Figure 1:
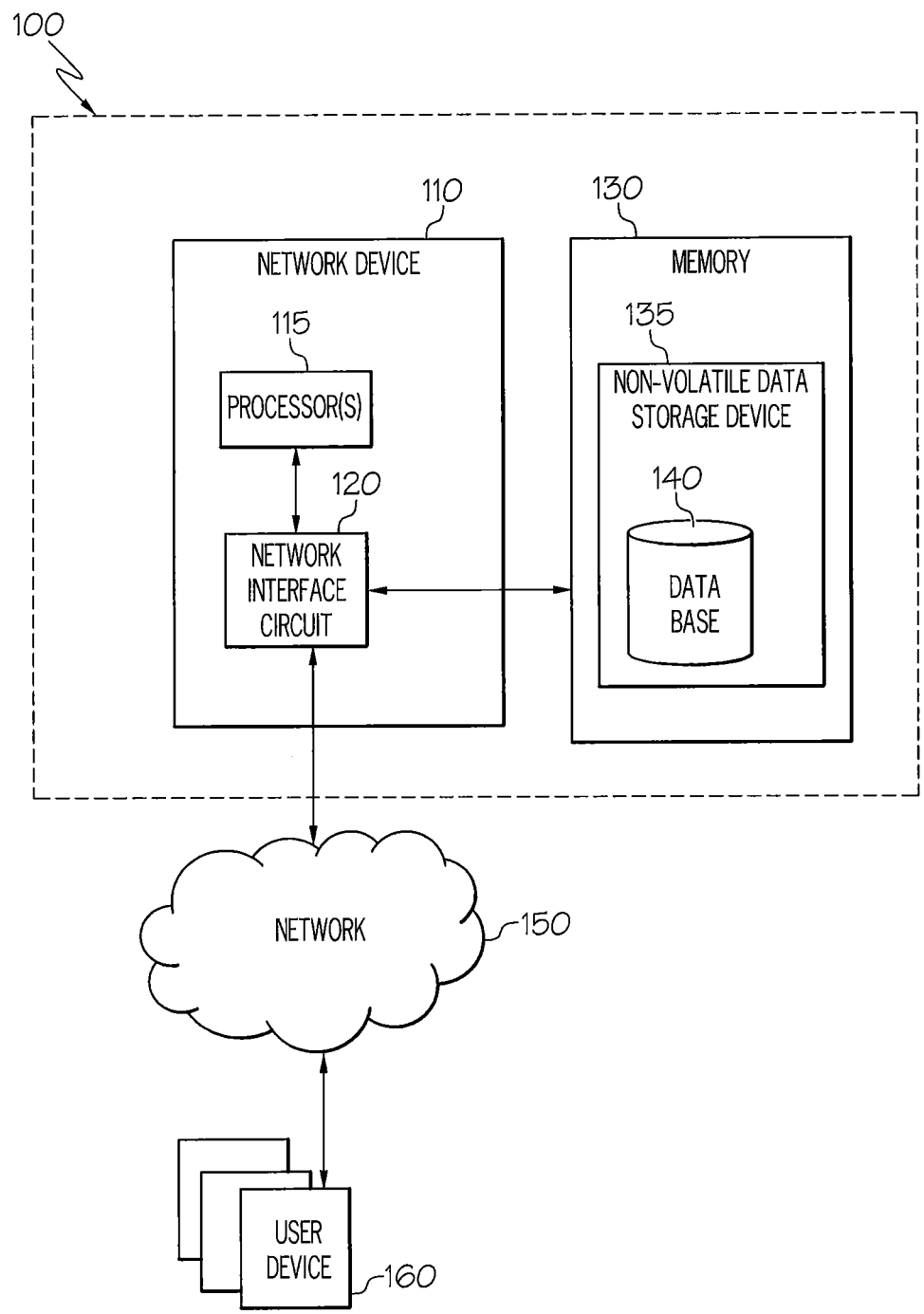
FIG. 1 illustrates a database management system including a network device for identifying customer support ticket relationships, according to various embodiments described herein.

Various embodiments will be described more fully hereinafter with reference to the accompanying drawings. Other embodiments may take many different forms and should not be construed as limited to the embodiments set forth herein. Like numbers refer to like elements throughout. Numerous specific details are set forth in order to provide a thorough understanding of embodiments of the present inventive concepts. However, it will be understood by those skilled in the art that the present invention may be practiced without these specific details. In other instances, well-known methods, procedures, components and circuits have not been described in detail so as to not obscure the present invention. It is intended that all embodiments disclosed herein can be implemented separately or combined in any way and/or combination.

As noted above, customer support centers associated with large organizations may receive a high volume of customer support tickets entered into a database for processing. Data-Base Management Systems (DBMSs) are specially designed software applications that interact with users, other applications and a database itself, to capture and analyze data. More specifically, a DBMS may allow the definition, creation, querying, update and administration of databases. Commercially available DBMSs include MySQL, PostgreSQL, SQLite, Microsoft SQL Server, Microsoft Access, Oracle, SAP, dBASE, FoxPro, IBM DB2, LibreOffice Base and FileMaker Pro. The database may be organized in any form, such as, for example, tables, linked lists, queues, etc. Several of the customer support tickets may be directed to related issues. Furthermore, as issues are investigated, additional information regarding details of the problem and/or solutions to the problem may be updated in the customer support tickets. Upon assignment of a customer support ticket to investigate an issue, customer support personnel such as a customer support engineer may desire to review other customer support tickets in the database that may be related to a currently assigned customer support ticket. Keyword searches may be conducted to search for previous tickets that include the keywords. However, results of the keyword search may yield many records from the database. The customer support engineer would need to manually parse many records from the database to try to determine relevant customer support tickets that are related to the presently assigned customer support ticket.

Various embodiments described herein may arise from a recognition of a need for improved and/or automatic identification of related customer support tickets in a database management system based on direct relationships between tickets and/or predicted relationships that are derived. Relationships between tickets may need to be determined in real time (i.e. when a new customer support ticket is added) and/or based on historical data (existing customer support tickets). Predicted relationships between customer support tickets may be derived using edge prediction applied to graphs generated based on customer support tickets in a database. The nodes in a graph may represent customer support tickets and edges in the graph may represent association between corresponding nodes.

The predicted relationships may be updated/modified as customer support tickets in the database are updated. A customer support engineer assigned a given customer support ticket may be provided with a data set of related customer support tickets in the database based on the predicted relationships. For example, ticket 1 may be related to ten other tickets. Ticket 2 may be related to the same ten tickets. However, ticket 3 may be related to only two of these tickets. It may be concluded that ticket 3 is somewhat related to ticket 1 and ticket 2, based on the information regarding the related tickets of ticket 1 and ticket 2. In this case, the customer support engineer working on ticket 1 may be provided with an indication that ticket 3 may be somewhat related.

Various embodiments described herein provide methods, devices, and computer program products to provide related customer support tickets in a database. FIG. 1 is a block diagram of a database management system including a network device for identifying customer support ticket relationships and communicating via a network to user devices, according to various embodiments. Referring now to FIG. 1, a network device 110 and a memory 130 may be associated with a database management system 100. The network device 110 may communicate over a computer network 150. The network device 110 may include a network interface circuit 120 that interfaces over computer network 150 to one or more user devices 160. User devices 160 may be accessible by a customer support ticket engineer and/or by a person or entity reporting an issue. The network device 110 may include one or more customer support ticket relationship processors 115. The network device 110 may access information in a memory 130 associated with the database management system 100. The memory 130 may include a database 140 that is associated with a non-volatile storage device 135. The network device 110, via network 150 may receive information associated with a first customer support ticket from user device 160 that is associated with a user. The information associated with the first customer support ticket may be received by the network device 110 through a network interface circuit 120. User devices 10 may include output devices, such as a graphical display and/or loudspeaker, and input devices, such as a keyboard, touch screen, mouse and/or microphone. Processor 115, memory 130 and the user devices 160 may communicate with one another over a network and/or using other computer architectures. The user devices 160 may also be connected to the processor 115 directly or by any conventional public and/or private, cloud, real and/or virtual wired and/or wireless network including all or a portion of the global communication network known as the Internet.

Network device 110 may determine a direct relationship between the first customer support ticket and a second customer support ticket in the database 140. The network device 110 may generate a graph based on information in the database 140. The information in the database 140 may be modeled as an unweighted and/or weighted graph in which nodes represent customer support tickets. Edge prediction may be performed on the graph to derive relationships between nodes in the graph. Predictive relationships may be derived based on the edge prediction. A relationship data set associated with the first customer support ticket may be generated to indicate customer support tickets in the database 140 associated with the predicted relationships. The relationship data set may be communicated to the user device 160 through the network interface circuit 120 of the network device 110.

Figure 2:
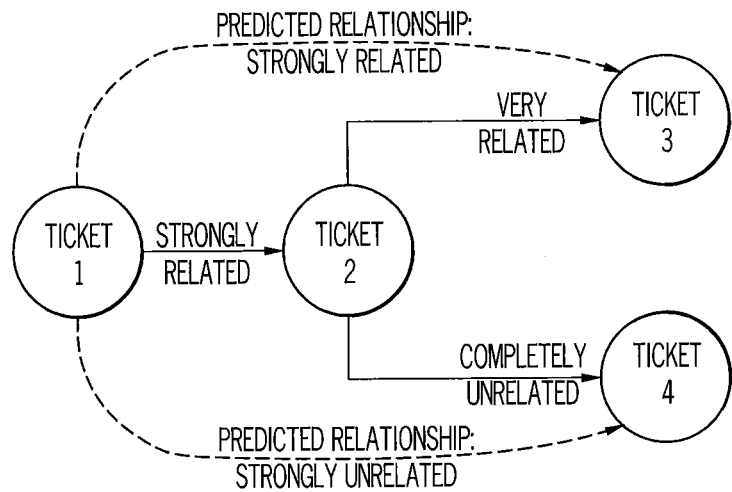
FIGS. 2 to 5D illustrate predicting of relationships between customer support tickets, according to various embodiments described herein.

Various example embodiments will now be discussed in order to better understand some of the present inventive concepts. Referring now to FIG. 2, a database may include ticket 2, ticket 3, and ticket 4, along with many other tickets. Customer support ticket 1 may be entered at the user device 160 of FIG. 1. The network device 110 of FIG. 1 may create a graph indicating relationships between tickets 1, 2, 3, and/or 4. A graph is representation of a set of objects where some objects are connected by links. The interconnected objects are represented by mathematical abstractions called vertices, nodes, and/or points. Links that connect some pairs of vertices are called edges, arcs, and/or lines. Typically, a graph is depicted in diagrammatic form as a set of dots for the vertices, joined by lines or curves for the edges. In this case, the nodes in the graph represent customer support tickets and edges in the graph represent association between corresponding nodes.

Edge prediction uses mathematical techniques to predict the likelihood of association between nodes in the graph. Still referring to FIG. 2, edge prediction may be employed to determine the relationships between the four tickets. Edge prediction techniques may determine that ticket 1 is strongly related to ticket 2. Ticket 2 may be very related to ticket 3. However, ticket 2 may be completely unrelated to ticket 4. As used herein, "complete unrelated" tickets may have a probability of relatedness below a threshold. Stated differently, the tickets may be unrelated with a higher probability of not being related, as will be discussed with respect to FIG. 3. Based on the results of edge prediction algorithms, the predicted relationship may be determined between ticket 3 and ticket 1 to be strongly related. However, it may be determined that ticket 4 and ticket 1 are strongly unrelated. In this manner, a database management system may automatically predict and provide strongly related tickets to the customer support engineer who is assigned ticket 1. The database management system may be a non-relational database that stores records customer support tickets. As described by the present inventive concepts, the database management system may derive relationships between tickets in the non-relational database. In some embodiments, the database management system may be a relational database that stores customer support tickets in a relational manner. However, as described by the present inventive concepts, new relationships may be discovered and/or predicted for customer support tickets in stored in the relational database.

Figure 3:
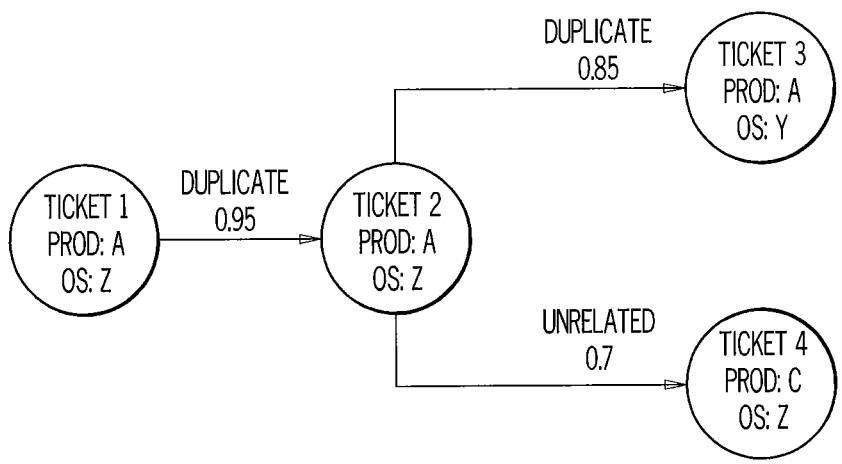
Figure 4:
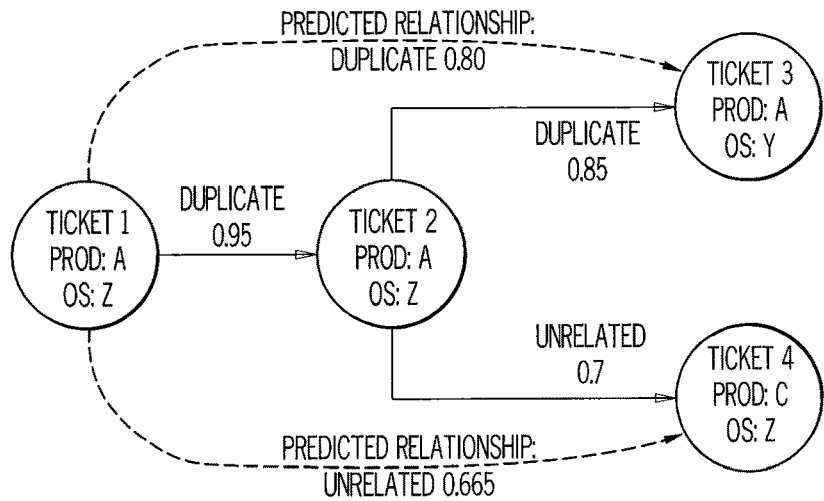

Various fields in the customer support ticket may be used in predicting related tickets. The degree of relatedness or probability of being a duplicate may be assessed based on various fields in the customer support tickets and/or based on edge prediction algorithms applied to the graph. Example fields in the customer support tickets such as the product in which the issue has arisen, the operating system or platform on which the issue has arisen, organizational work group that generated the issue, physical data location in memory, work site, subsystem, time of occurrence, and/or day of occurrence, etc. may be used by the edge prediction algorithms to determine relatedness between tickets. Referring now to FIG. 3, edge prediction may be applied to derive additional relationships to those represented in FIG. 2. These relationships may be quantified, as illustrated in FIG. 3. The edge prediction algorithm may determine that ticket 1 and ticket 2 are duplicates with a probability or confidence of 0.95. Similarly, ticket 3 may be a duplicate of ticket 2 with the confidence of 0.85. The edge prediction algorithms may determine with a 0.7 confidence that ticket 2 and ticket 4 are unrelated. In some embodiments, these confidence values may be used to predict relationships between various other tickets in the graph. Referring now to FIG. 4, based on the confidence values illustrated in FIG. 3, the predicted relationship between ticket 1 and ticket 3 is that they are duplicates of one another with a confidence value of 0.80. The predicted relationship between ticket 4 and ticket 1 may be that they are unrelated with the confidence of 0.665.

Figure 5A:
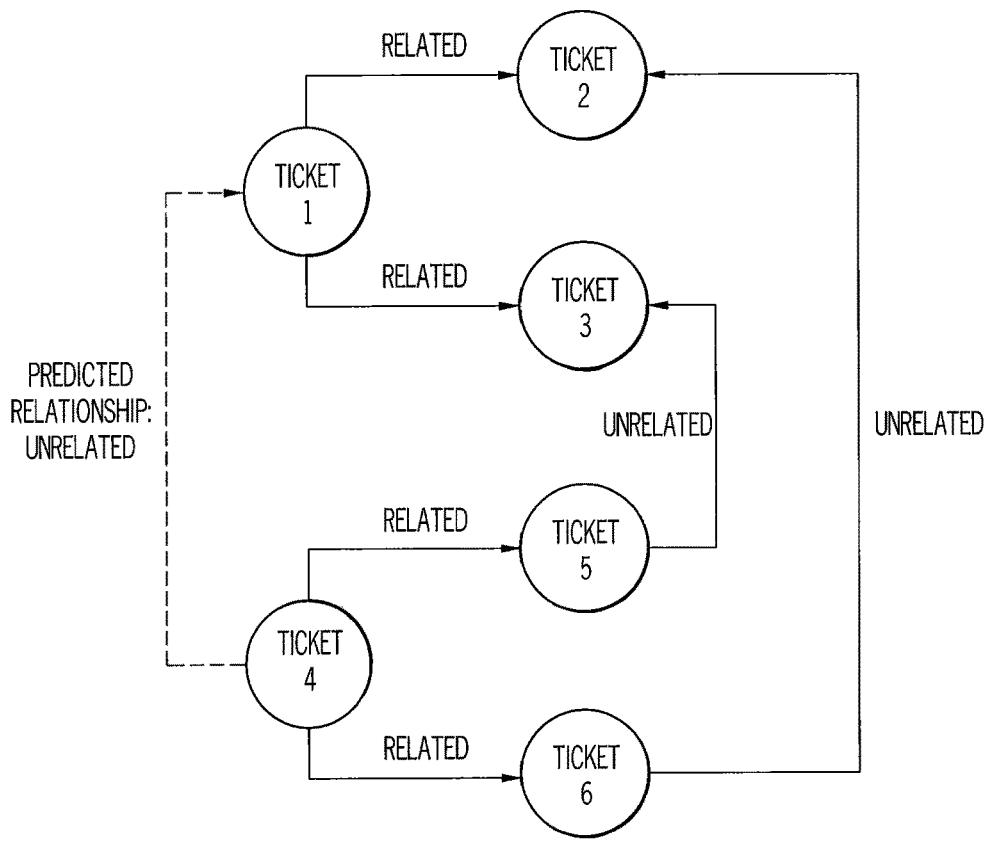
Figure 5B:
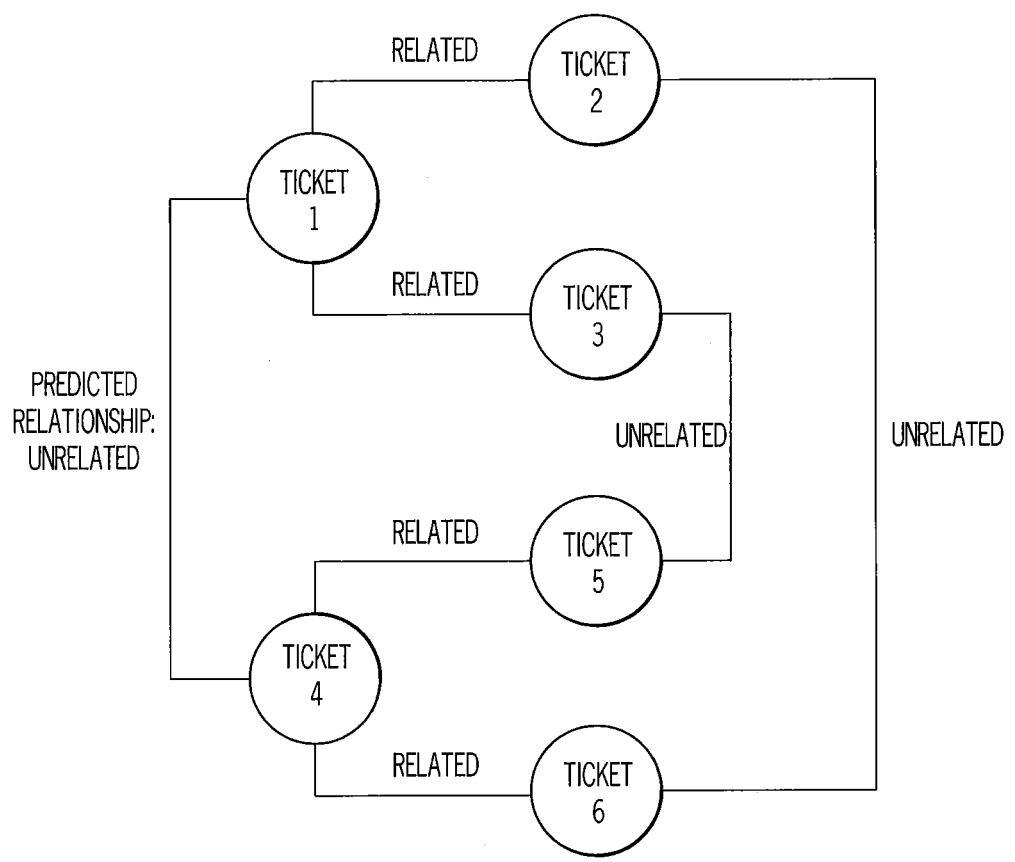

In some embodiments, such as illustrated in FIG. 5A and FIG. 5B, cycles may be detected in the graph. A cycle in a graph may consist of a sequence of nodes starting and ending at the same node, with each two consecutive nodes in the sequence adjacent to each other in the graph. Identifying the presence of cycles in the graph and patterns within these cycles may allow for additional relationships to be predicted. Patterns may be based on a direction of edges (if any are present), type of edges, attributes of the edges, and/or attributes of the nodes. FIG. 5A includes edges that are asymmetric, as depicted by the arrows indicating directional relationships. For example, an asymmetric relationship may exist between a ticket that is a follow up of another ticket. As an example, when trying to predict a relationship between the nodes for ticket 1 and the node for ticket 4, the topology of the graph including the directional relationships need to be analyzed in order to make this prediction. Such analysis requires to figure out a map (or the lack of such a map) from the node for ticket 1, the node for ticket 4, and their neighborhoods to an already known graph structure (for instance a sequence of 4 nodes, or a cycle such as the lack of a cycle including nodes for ticket 4, ticket 6, ticket 2 and ticket 1). In most cases, there will be at least another node involved in this analysis. And hence the analysis on three nodes may be the minimum analysis necessary in most real-world topological scenarios.

Referring now to FIG. 5A and FIG. 5B, example embodiments are illustrated. Ticket 1 may be related to ticket 2 and to ticket 3. Ticket 4 may be related to ticket 5 and to ticket 6. However, ticket 6 and ticket 2 may be unrelated and ticket 5 and ticket 4 may be unrelated. Based on detecting cycles in the graph that show unrelated links, it may be determined that the predicted relationship between ticket 1 and ticket 4 is unrelated. In other words, the database management system may conclude that ticket 1 and ticket 4 are not strongly related in the example embodiments of FIG. 5A and in FIG. 5B. For example, if we consider the case with two tickets in the database, ticket 1 (T1) and ticket 2 (T2). T1 may have a relationship toward T2 with a probability of being a duplicate of 0%. However, the relationship may not be symmetric such that the relationship from T2 to T1 has a probability of being related of 95%. In this example, the relationship between T1 and T2 is asymmetric since they have different probabilities. FIG. 5B includes edges that are undirected, indicating the that relationships between the tickets are symmetric. Symmetric relationships between nodes may include cases such as "equality" and "repeated" relationships. Mathematically, an undirected graph may be represented as a directed graph if the direction of the edge is hard-coded.

Figure 5C:
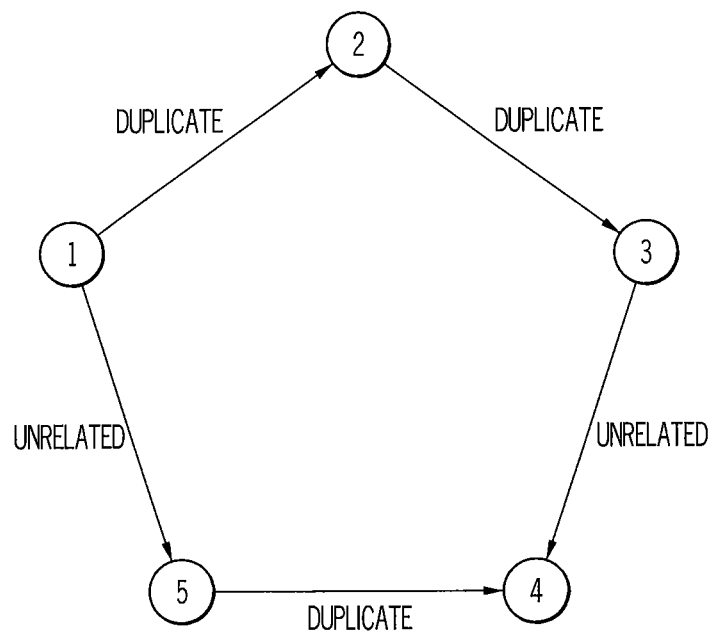
Figure 5D:
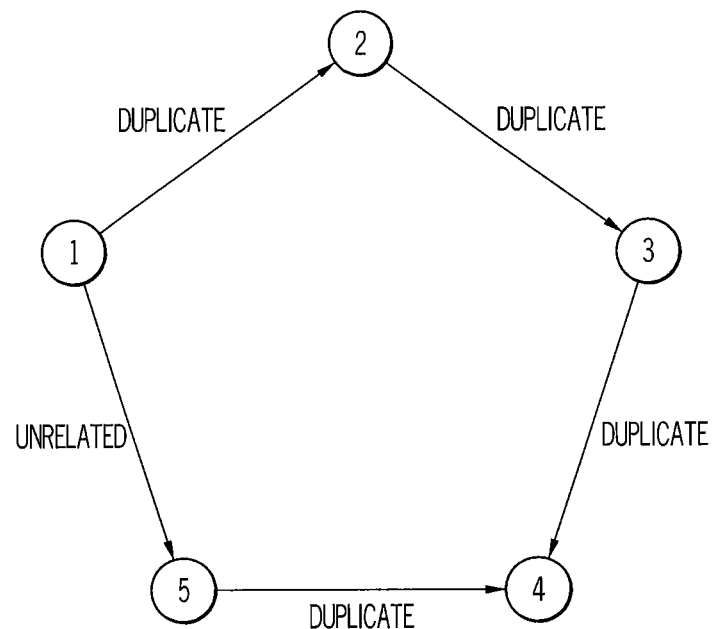

FIG. 5C and FIG. 5D illustrate example embodiments of directed graphs where a cycle may not be present, but additional information may be discerned by from the graph. A cycle in a directed graph requires traversing edges consistently with its direction. Even if graphs are directed, it may not be necessary to consider direction. Cycles may be detected in undirected versions of the graph. In both FIG. 5C and FIG. 5D cycles are not present in the directional graphs, but cycles are present if undirected versions of FIG. 5C and FIG. 5D (not illustrated) are considered. In considering undirected versions of FIG. 5C and FIG. 5D, the labels on the edges indicating duplicate tickets or unrelated tickets are of interest. FIG. 5C indicates that ticket 3 is unrelated to ticket 4 and that ticket 1 is unrelated to ticket 5. However, based on this topology of FIG. 5C, ticket 4 may be a duplicate of ticket 5. Analysis of an undirected version of the graph of FIG. 5C indicates these relationships to be consistent. Referring to FIG. 5D, consideration of an undirected version of FIG. 5D would provide a cycle. Ticket 3 is a duplicate of ticket 4 and ticket 1 is unrelated to ticket 5. However, this topology of FIG. 5D is inconsistent since tickets 1, 2, 3, and 4 are duplicates of one another and ticket 5 is a duplicate of ticket 4, but the graph indicates that ticket 1 is unrelated to ticket 5. Therefore, analysis of this graphs yields the conclusion that there is an inconsistency in the database, as detected by analysis of the undirected version of FIG. 5D.

The relationships between tickets and/or the graph of the tickets may be corrected based on additional analysis and/or based on additional information that is entered into the tickets. For example, referring once again to FIG. 4, as ticket 2 is being investigated by a customer support engineer, additional information may be input into the database record associated with ticket 2. This additional information may find a stronger degree of relationship between ticket 2 and ticket 4, even though they belong to different products. Updated ticket 2 and ticket 4 may be determined to be related. Consequently, the predicted relationship between ticket 4 and ticket 1 may be updated to indicate that they are related to one another. This update may be indicated to the respective customer support engineers associated with ticket 4 and/or with ticket 1, thus providing them an opportunity to use information discerned from one another.

Additionally, errors or inconsistencies of specific fields of customer support tickets may be detected. These errors may be automatically corrected and/or suggested corrections may be provided to the customer support engineer. In some cases, the author of a given customer support ticket or a customer support engineer may indicate that the given customer support ticket is related to another customer support ticket. For example, a text may be entered by the author indicating "Ticket 432 is very related to ticket 345." Textual processing such as Natural Language Processing (NPL) techniques, machine learning techniques, and/or data mining mechanisms may be applied to textual fields to determine relationships that are indicated by the author or the customer support engineer. However, the database management system may detect that this manually entered relationship is incorrect or has been entered by mistake and subsequently take steps to correct the mistake automatically and/or indicate to the author or the customer support engineer that the relationship is incorrect. In some embodiments, the database management system may automatically determine that two tickets are related based on the previously described edge prediction techniques. However, the customer support engineer, during issue investigation, may determine that these tickets are not related. The customer support engineer would then have an opportunity to change the incorrectly indicated relationship. Subsequent to the customer support engineer's changing of an incorrect relationship, the database management system may reevaluate and/or update other relationships in the graph.

Figure 6:
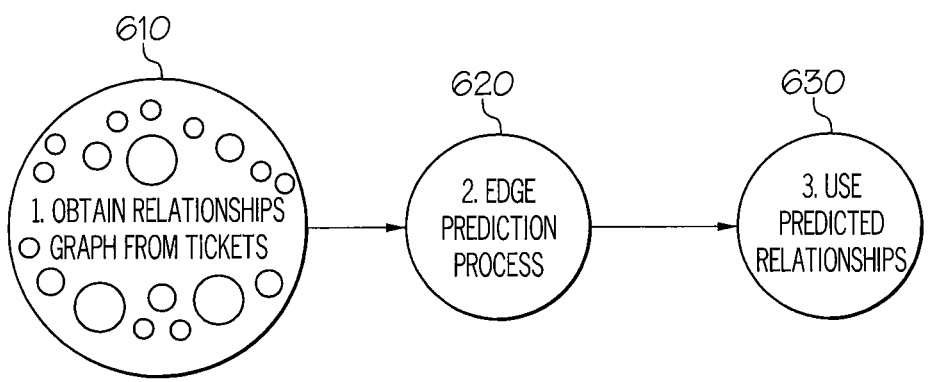
FIG. 6 illustrates application of edge prediction to predict relationships between customer support tickets, according to various embodiments described herein.

In some embodiments, customer tickets may be grouped together according to levels of relatedness with certain tickets to make clusters of tickets related to fields or topics in the database records. Referring now to FIG. 6, at block 610, a graph of the relationships between tickets may be obtained, as discussed with respect to FIGS. 2, 3, 4, and/or 5. At block 620, an edge prediction process may be applied. At block 630, predicted relationships from the edge prediction process may be applied such that clusters of nodes are formed that each includes two or more nodes representing customer support tickets. Each cluster may include nodes that are directly related to one another. In some embodiments, "directly related" tickets may have a probability of relatedness above a threshold. In some embodiments, "directly related" tickets may be a distance of one hope from one another in the graph. Customer support tickets associated with the nodes in a cluster may be grouped together in an ordered list by providing an indicator to identify the cluster of nodes. Furthermore, tickets within a cluster may be ranked according to the level of relatedness, so as to draw the customer support engineer's attention to the most relevant tickets within the cluster. In some embodiments, tickets that are closed and/or solved may be ranked higher in the ordered list and/or may be weighted heavier in determining the level of relatedness.

Figure 7:
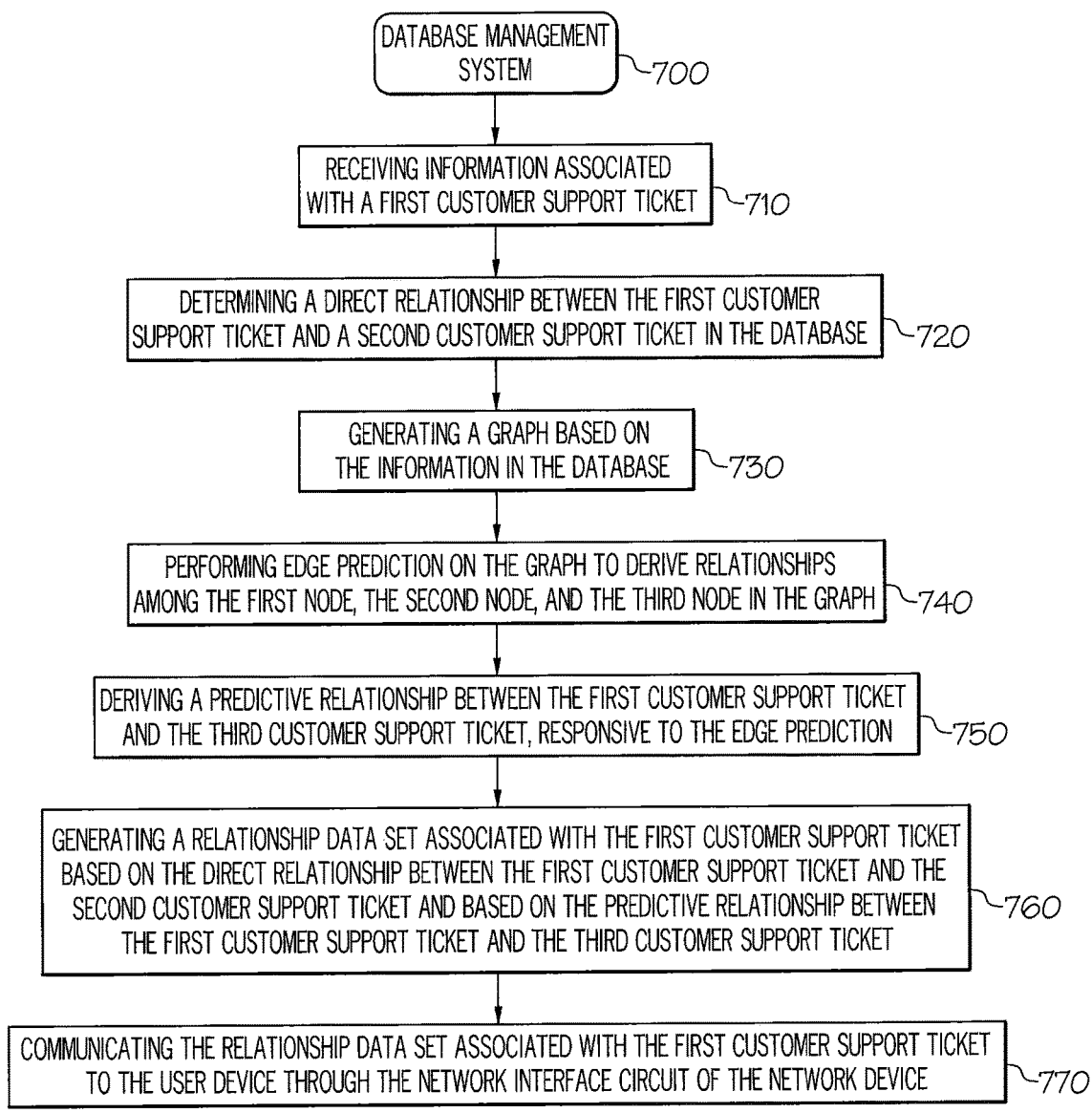
FIGS. 7 to 13 are flowcharts of operations that may be performed by the network device of FIG. 1, according to various embodiments described herein.

Referring now to FIG. 7, a flowchart of operations that may be performed by a customer support ticket relationship processor 115 of network device 110 of FIG. 1 is presented. These operations may be executed by the customer support ticket relationship processor 115 of network device 110 and may be stored in memory 130 or in the network device 110 of FIG. 1 to be executed by customer support ticket relationship processor 115 of network device 110 of FIG. 1. At block 700, a database management system 100 including network device 110 of FIG. 1 may be configured to use edge prediction to determine related customer support tickets of, for example, FIGS. 2 to 4. The network device 110 of FIG. 1 may receive information associated with a first customer support ticket from a user device at block 710 of FIG. 7. A direct relationship between the first customer support ticket and the second customer support ticket in the database may be determined based on information in the database management system and based on information associated with the first customer support ticket, at block 720.

Still referring to FIG. 7, a graph may be generated based on information in the database at block 730. The graph may include a first node representing the first customer support ticket, a second node representing the second customer support ticket, and a third node representing a third customer support ticket. Edge prediction techniques, also referred to as link prediction, may be performed on this graph to derive relationships among the first node, the second node, and the third node in the graph, at block 740. The nodes in the graph represent customer support tickets and edges in the graph represent association between corresponding nodes. Edge prediction uses mathematical techniques to predict the likelihood of association between nodes in the graph. Edge/Link prediction leverages information in the node structure to identify missing links or predict new links for future use. Edge prediction techniques may provide weights, ranks, and/or level of relatedness values for use in relating tickets, clustering tickets, and/or generating ordered lists of related tickets. A direct relationship may be known between the first customer support ticket and the second customer support ticket in the graph. Based on the edge prediction applied to the graph, a predictive relationship may be derived between the first customer support ticket and the third customer support ticket, at block 750. Based on the predictive relationship between the first customer support ticket and the third customer support ticket, a relationship data set associated with the first customer support ticket may be generated, at block 760. The relationship data set may be based on a direct relationship between the first customer support ticket and the second customer support ticket. The relationship data set associated with the first customer support ticket may be communicated to the user device 160 through the network interface circuit 120 of the network device 110 a FIG. 1.

Figure 8:
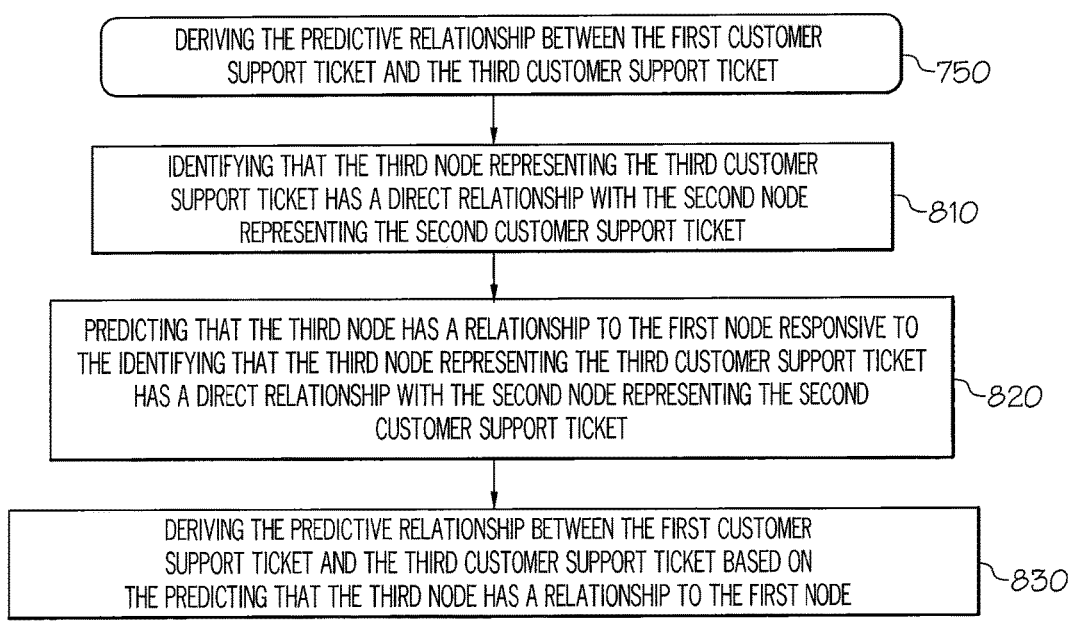

Referring now to FIG. 8, deriving the predictive relationship between the first customer support ticket and the third customer support ticket, at block 750, will be discussed in greater detail. Deriving the predicted relationship may include identifying that the third node representing the third customer support ticket has a direct relationship with the second node representing the second customer support ticket, at block 810, as illustrated, for example in FIGS. 2 to 4. Based on identifying that the third node has a direct relationship with the second node, it may be predicted that the third node has a relationship to the first node, at block 820. Based on this prediction that the third node has a relationship to the first node, a predictive relationship between the first customer support ticket and third customer support ticket may be derived, at block 830. The predictive relationship may include a confidence value, weight, and/or probability to indicate a strength of the predictive relationship.

Figure 9:
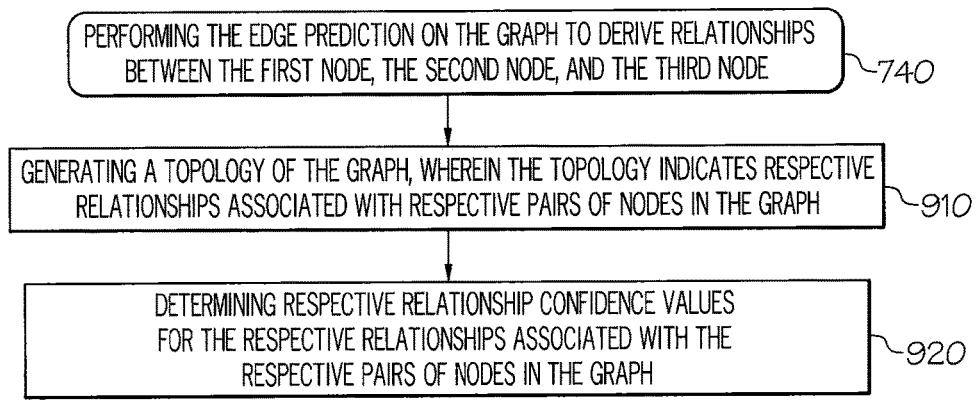

Referring now to FIG. 9, performing edge prediction on the graph to derive relationships between nodes, at block 740, will now be discussed in greater detail. A topology of the graph may be generated, at block 910. The topology may indicate relationships associated with pairs of nodes in the graph, as illustrated, for example in FIG. 4. The topology of the graph may indicate links between nodes and provide hops between nodes. Hops between nodes may aide in discerning centrality metrics for identifying important vertices within the graph. Centrality metrics may include betweeness, closeness, eigenvector centrality, degree centrality, harmonic centrality, etc. The topology of the graph may denote positive or negative relationships between nodes in the graph. Relationship confidence values associated with respective pairs of nodes in the graph may be determined, at block 920. These relationship confidence values may be used to characterize the level of relatedness of relationships between various other tickets in the graph. In some embodiments the relationship confidence value may be based on a number of hops in the graph between the nodes.

Figure 10:
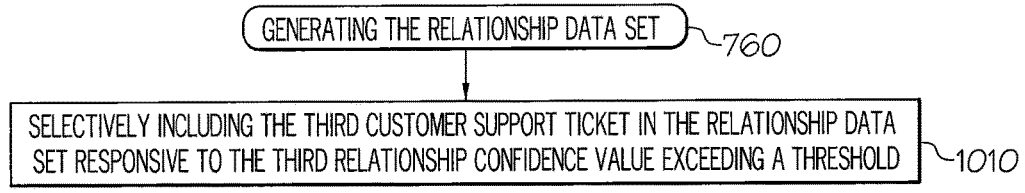

Referring now to FIG. 10, a relationship data set may be generated, a block 760. Various criteria may be used to determine which customer support tickets are included in the relationship data set. Mechanisms to filter out unnecessary or uninformative relationships generated by the edge prediction algorithm may be applied. For example, a customer support ticket may be included in the relationship data set if the relationship confidence value exceeds the threshold, at block 1010. In some embodiment, a ticket may be included in the relationship data set if the number of hops in the graph is less than a threshold. In some embodiments, only customer support tickets with direct relationships may be included in the relationship data set. A direct relationship may be such that the customer support tickets are separated by a distance of exactly one hop. In some embodiments, customer support tickets with indirect relationships may be included in the relationship data set either exclusively, or in conjunction with directly related customer support tickets. In some embodiments, customer support tickets with indirect relationships may be separated by a distance of two or more hops. Additional criteria such as product, operating system or platform, subsystem, organizational work group, work site, time of occurrence, and/or day of occurrence, etc. may be considered when generating the relationship data set.

Figure 11:
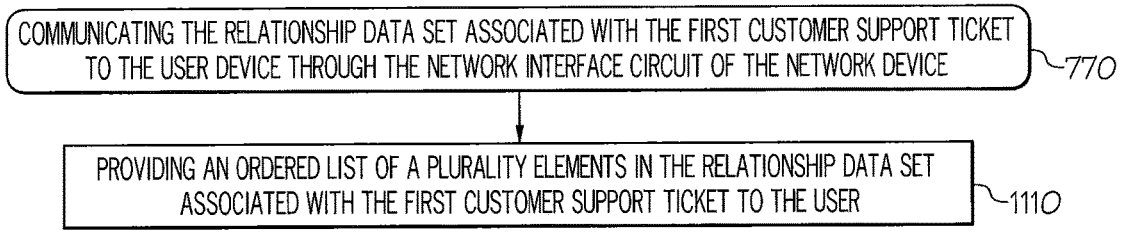

Referring now to FIG. 11, the relationship data set associated with the first customer support ticket may be communicated to the user device, at block 770. An ordered list of elements in the relationship data set may be provided to the user, at block 1110. The ordered list may be organized such that customer support tickets that have the highest correlation of relatedness may be given the highest priority. The ordering in the list may indicate to the customer support engineer who is looking at a given customer support ticket the most likely related tickets that the customer support engineer should review. The ordered list may indicate clusters of tickets related to specific topics and/or parameters.

Figure 12:
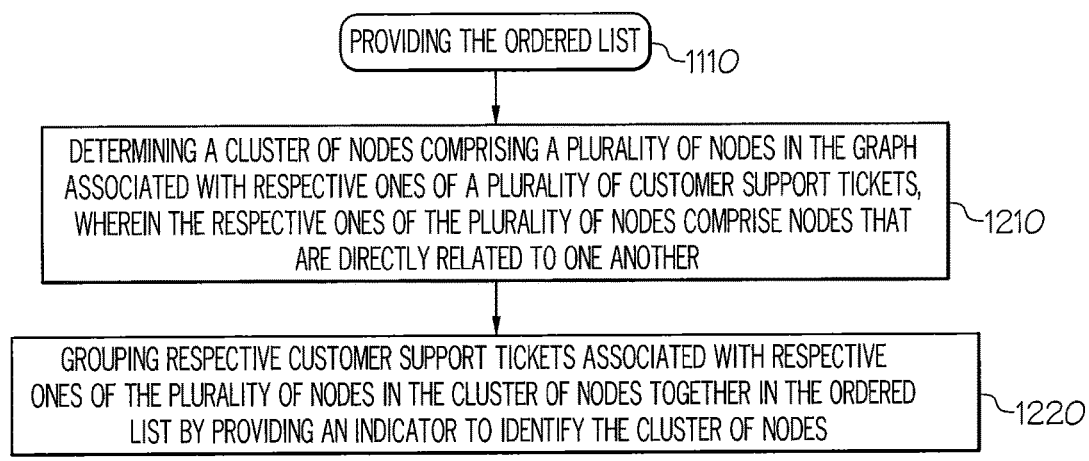

Referring now to FIG. 12, an ordered list may be provided, at block 1110. A cluster of nodes including nodes in the graph associated with customer support tickets may be determined at block 1210. Customer support tickets associated with nodes in the cluster may be grouped together in the ordered list by providing an indicator to identify the cluster of nodes, at block 1220.

Figure 13:
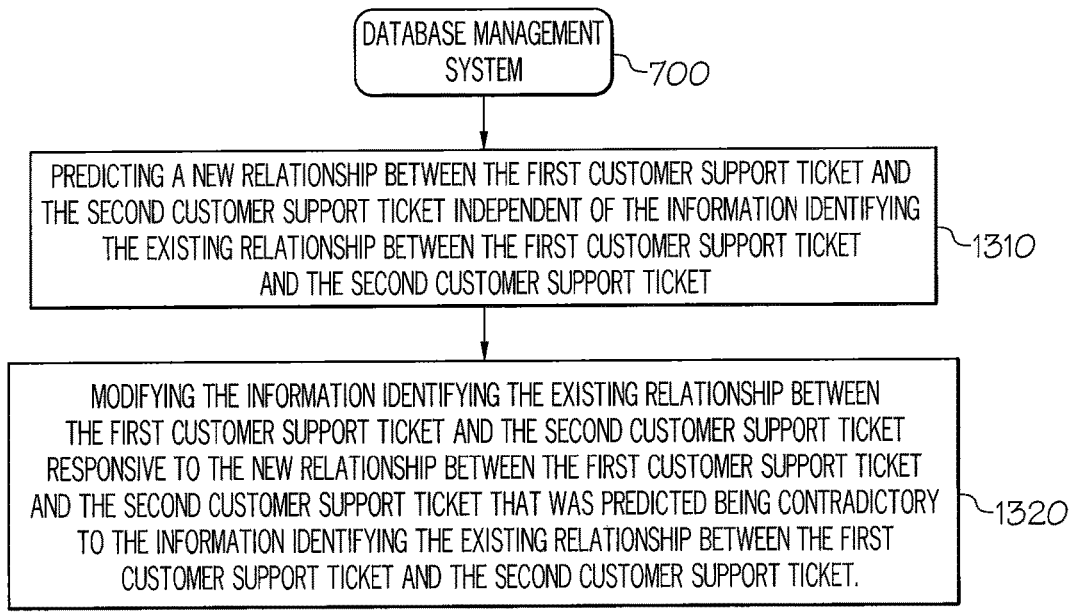

Referring now to FIG. 13, a new relationship between the first customer support ticket and the second customer support ticket may be predicted, independent of information identifying an existing relationship between the first customer support ticket and the second customer support ticket, at block 1310. In other words, changes or updates to either the first customer support ticket or the second customer support ticket may trigger identification of a new relationship, modify an existing relationship, or change the level of relatedness. For example, an update to the second customer support ticket with additional information describing the problem may increase the level of relatedness between the first customer support ticket and the second customer support ticket. The information identifying the existing relationship between the first customer support ticket and the second customer support ticket may be modified if the new relationship between the first customer support ticket and the second customer support ticket is contradictory to an existing relationship between the tickets, at block 1320.

Methods, devices and computer program products for improved database management systems have been discussed in detail. As described herein, customer support tickets in a database may be related to one another with a greater degree of accuracy in order to assist customer support engineers in accessing related tickets in order to discern information to solve a given customer support ticket. Using edge prediction techniques, improved and/or automatic identification of related customer support tickets in the database management system has been discussed.

Various embodiments were described herein with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

It will be understood that, when an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Furthermore, "coupled", "connected", "responsive", or variants thereof as used herein may include wirelessly coupled, connected, or responsive. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise. Well-known functions or constructions may not be described in detail for brevity and/or clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. Moreover, as used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

As used herein, the terms "user equipment", "user device", or the like, includes user input/output devices including output devices, such as a graphical display and/or loudspeaker, and input devices, such as a keyboard, touch screen, mouse and/or microphone. A processor, a memory, and the user devices may communicate with one another over one or more buses and/or using other computer architectures. The user devices may also be connected to a processor directly or by any conventional public and/or private, real and/or virtual wired, cloud, and/or wireless network including all or a portion of the global communication network known as the Internet.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof.

Example embodiments were described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by processor circuitry. These computer program instructions may be provided to processor circuitry of a general purpose computer circuit, special purpose computer circuit such as a digital processor, and/or other programmable data processor circuit to produce a machine, such that the instructions, which execute via the processor circuitry of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluRay).

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present invention may be embodied in hardware and/or in software (including firmware, resident software, micro-code, etc.) that runs on a processor such as a digital signal processor, which may collectively be referred to as "processor circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments were disclosed herein, in connection with the following description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A database management method, the method comprising:

performing, by a customer support ticket relationship processor of a network device associated with a database management system in a computer network, operations comprising:

receiving, from a user device that is associated with a user through a network interface circuit of the network device, information associated with a first customer support ticket;

determining, based on information in the database management system comprising a database stored in a memory comprising a non-volatile data storage device and based on the information associated with the first customer support ticket, a direct relationship between the first customer support ticket and a second customer support ticket in the database;

generating a graph based on the information in the database, the graph comprising a first node representing the first customer support ticket, a second node representing the second customer support ticket, and a third node representing a third customer support ticket;

performing edge prediction on the graph to derive relationships among the first node, the second node, and the third node in the graph;

deriving a predictive relationship between the first customer support ticket and the third customer support ticket, responsive to the edge prediction;

generating a relationship data set associated with the first customer support ticket based on the direct relationship between the first customer support ticket and the second customer support ticket and based on the predictive relationship between the first customer support ticket and the third customer support ticket; and communicating the relationship data set associated with the first customer support ticket to the user device through the network interface circuit of the network device.

2. The method of claim 1, wherein the deriving the predictive relationship between the first customer support ticket and the third customer support ticket comprises:

identifying that the third node representing the third customer support ticket has a direct relationship with the second node representing the second customer support ticket;

predicting that the third node has a relationship to the first node responsive to the identifying that the third node representing the third customer support ticket has a direct relationship with the second node representing the second customer support ticket; and deriving the predictive relationship between the first customer support ticket and the third customer support ticket based on the predicting that the third node has a relationship to the first node.

3. The method of claim 2, wherein the predictive relationship comprises either of strongly related or strongly unrelated, and wherein the third node does not have a direct relationship with the first node.

4. The method of claim 1, wherein the performing the edge prediction on the graph to derive relationships between the first node, the second node, and third node comprises:

generating a topology of the graph, wherein the topology indicates respective relationships associated with respective pairs of nodes in the graph; and determining respective relationship confidence values for the respective relationships associated with the respective pairs of nodes in the graph, wherein the respective pairs of nodes in the graph comprise a first pair comprising the first node and the second node, a second pair comprising the second node and the third node, and a third pair comprising the first node and the third node.

5. The method of claim 4, wherein a relationship confidence value of the respective relationship confidence values is based on an attribute associated with a respective pair of nodes in the graph.

6. The method of claim 5, wherein the attribute comprises product information, product release information, operating system used a customer, impact to organization, and/or severity.

7. The method of claim 4, wherein a first relationship confidence value is associated with the first pair, wherein a second relationship confidence value is associated with the second pair, and wherein a third relationship confidence value is associated with the third pair.

8. The method of claim 7, wherein the generating the relationship data set comprises:
    selectively including the third customer support ticket in the relationship data set responsive to the third relationship confidence value exceeding a threshold.

9. The method of claim 7,
    wherein the first relationship confidence value is based on a number of hops in the graph between the first node and the second node,
    wherein the second relationship confidence value is based on a number of hops in the graph between the second node and the third node, and
    wherein the third relationship confidence value is based on a number of hops in the graph between the first node and the third node.

10. The method of claim 1, wherein the communicating the relationship data set associated with the first customer support ticket to the user device comprises:
    providing an ordered list of a plurality elements in the relationship data set associated with the first customer support ticket to the user.

11. The method of claim 10, wherein the ordered list provides a higher priority to an element in the relationship data set that comprises a customer support ticket status of active.

12. The method of claim 10, wherein the ordered list is either of a ranked list or a weighted list.

13. The method of claim 10, wherein the providing the ordered list comprises:
    determining a cluster of nodes comprising a plurality of nodes in the graph associated with respective ones of a plurality of customer support tickets, wherein the respective ones of the plurality of nodes comprise nodes that are directly related to one another; and
    grouping respective customer support tickets associated with respective ones of the plurality of nodes in the cluster of nodes together in the ordered list by providing an indicator to identify the cluster of nodes.

14. The method of claim 1, wherein the information in the database management system comprises information identifying an existing relationship between the first customer support ticket and the second customer support ticket, the method further comprising:
    predicting a new relationship between the first customer support ticket and the second customer support ticket independent of the information identifying the existing relationship between the first customer support ticket and the second customer support ticket; and
    modifying the information identifying the existing relationship between the first customer support ticket and the second customer support ticket responsive to the new relationship between the first customer support ticket and the second customer support ticket that was predicted being contradictory to the information identifying the existing relationship between the first customer support ticket and the second customer support ticket.

15. A network device comprising:
    a network interface configured to communicate with a user device through a data network;
    a customer support ticket relationship processor; and
    a memory coupled to the customer support ticket relationship processor and storing computer readable program code that is executable by the customer support ticket relationship processor to perform operations comprising:
        receiving, from a user device that is associated with a user through a network interface circuit of the network device, information associated with a first customer support ticket;
        determining, based on information in a database management system comprising a database stored in a memory comprising a non-volatile data storage device and based on the information associated with the first customer support ticket, a direct relationship between the first customer support ticket and a second customer support ticket in the database;
        generating a graph based on the information in the database, the graph comprising a first node representing the first customer support ticket, a second node representing the second customer support ticket, and a third node representing a third customer support ticket;
        performing edge prediction on the graph to derive relationships among the first node, the second node, and the third node in the graph;
        deriving a predictive relationship between the first customer support ticket and the third customer support ticket, responsive to the edge prediction;
        generating a relationship data set associated with the first customer support ticket based on the direct relationship between the first customer support ticket and the second customer support ticket and based on the predictive relationship between the first customer support ticket and the third customer support ticket; and
        communicating the relationship data set associated with the first customer support ticket to the user device through the network interface circuit of the network device.

16. The network device of claim 15, wherein the deriving the predictive relationship between the first customer support ticket and the third customer support ticket comprises:
    identifying that the third node representing the third customer support ticket has a direct relationship with the second node representing the second customer support ticket;
    predicting that the third node has a relationship to the first node responsive to the identifying that the third node representing the third customer support ticket has a direct relationship with the second node representing the second customer support ticket; and
    deriving the predictive relationship between the first customer support ticket and the third customer support ticket based on the predicting that the third node has a relationship to the first node.

17. The network device of claim 15, wherein the performing the edge prediction on the graph to derive relationships between the first node, the second node, and third node comprises:
generating a topology of the graph, wherein the topology indicates respective relationships associated with respective pairs of nodes in the graph; and
determining respective relationship confidence values for the respective relationships associated with the respective pairs of nodes in the graph,
wherein the respective pairs of nodes in the graph comprise a first pair comprising the first node and the second node, a second pair comprising the second node and the third node, and a third pair comprising the first node and the third node.

18. A computer program product, comprising:
a non-transitory computer readable storage medium comprising computer readable program code embodied in the medium that when executed by a customer support ticket relationship processor of a first network device causes the processor to perform operations comprising:
receiving, from a user device that is associated with a user through a network interface circuit of the network device, information associated with a first customer support ticket;
determining, based on information in a database management system comprising a database stored in a memory comprising a non-volatile data storage device and based on the information associated with the first customer support ticket, a direct relationship between the first customer support ticket and a second customer support ticket in the database;
generating a graph based on the information in the database, the graph comprising a first node representing the first customer support ticket, a second node representing the second customer support ticket, and a third node representing a third customer support ticket;
performing edge prediction on the graph to derive relationships among the first node, the second node, and the third node in the graph;
deriving a predictive relationship between the first customer support ticket and the third customer support ticket, responsive to the edge prediction;
generating a relationship data set associated with the first customer support ticket based on the direct relationship between the first customer support ticket and the second customer support ticket and based on the predictive relationship between the first customer support ticket and the third customer support ticket; and
communicating the relationship data set associated with the first customer support ticket to the user device through the network interface circuit of the network device.

19. The computer program product of claim 18, wherein the deriving the predictive relationship between the first customer support ticket and the third customer support ticket comprises:
identifying that the third node representing the third customer support ticket has a direct relationship with the second node representing the second customer support ticket;
predicting that the third node has a relationship to the first node responsive to the identifying that the third node representing the third customer support ticket has a direct relationship with the second node representing the second customer support ticket; and
deriving the predictive relationship between the first customer support ticket and the third customer support ticket based on the predicting that the third node has a relationship to the first node.

20. The computer program product of claim 18, wherein the performing the edge prediction on the graph to derive relationships between the first node, the second node, and third node comprises:
generating a topology of the graph, wherein the topology indicates respective relationships associated with respective pairs of nodes in the graph; and
determining respective relationship confidence values for the respective relationships associated with the respective pairs of nodes in the graph,
wherein the respective pairs of nodes in the graph comprise a first pair comprising the first node and the second node, a second pair comprising the second node and the third node, and a third pair comprising the first node and the third node.

* * * * *